United States Patent [19]

Costello et al.

[11] Patent Number: 4,510,351
[45] Date of Patent: Apr. 9, 1985

[54] ACD MANAGEMENT INFORMATION SYSTEM

[75] Inventors: Peter E. Costello, Matawan; Lawrence D. Fossett, Morganville; Michael S. Lane, Colts Neck; Terrence T. Quin, Holmdel; Nicholas K. Smith, Middletown, all of N.J.

[73] Assignee: AT&T Bell Laboratories, Murray Hill, N.J.

[21] Appl. No.: 437,433

[22] Filed: Oct. 28, 1982

[51] Int. Cl.³ .................. G06F 3/147; H04M 3/50; H04Q 3/64
[52] U.S. Cl. .................. 179/27 D; 179/8 A
[58] Field of Search .......... 179/8 A, 8 R, 27 D, 179/27 DA, 27 DB, 27 FC, 27 FH, 175.2 C, 7.1 R; 340/721

[56] References Cited

U.S. PATENT DOCUMENTS

| 4,256,928 | 3/1981 | Lesea et al. | 179/18 BE |
|---|---|---|---|
| 4,258,361 | 3/1981 | Hydes et al. | 340/721 |
| 4,289,934 | 9/1981 | Pitroda et al. | 179/27 D |
| 4,408,100 | 10/1983 | Pritz et al. | 179/27 D |
| 4,414,628 | 11/1983 | Ahuja et al. | 364/200 |

OTHER PUBLICATIONS

"No. 1 ESS Furnishes ACD Service", Lanty et al., *Bell Laboratories Record*, Mar. 1978, pp. 76–82.
"Automatic Call Distribution Services in the Rolm CBX", Kanow, Int'l. Conf. on Commins., Seattle, Jun. 1980, pp. 19.4.1–19.4.7.
"ACD 5000, Automatic Distribution of Incoming Calls", product brochure, Gustav A. Ring A/S, (Norway).

*Primary Examiner*—Thomas W. Brown
*Attorney, Agent, or Firm*—David H. Tannenbaum

[57] ABSTRACT

There is disclosed an ACD management information system which tracks attendant work performance without regard to the actual station at which the attendant is operating. The system also monitors non-ACD work states and provides individualized status reports based upon temporarily stored limit criteria. A real time display of system performance is provided to a supervisor in a manner which allows for immediate rearrangement of the system without resort to other data. The displayed data includes split handling information, and call abandon information, trunk busy information and work state information.

15 Claims, 18 Drawing Figures

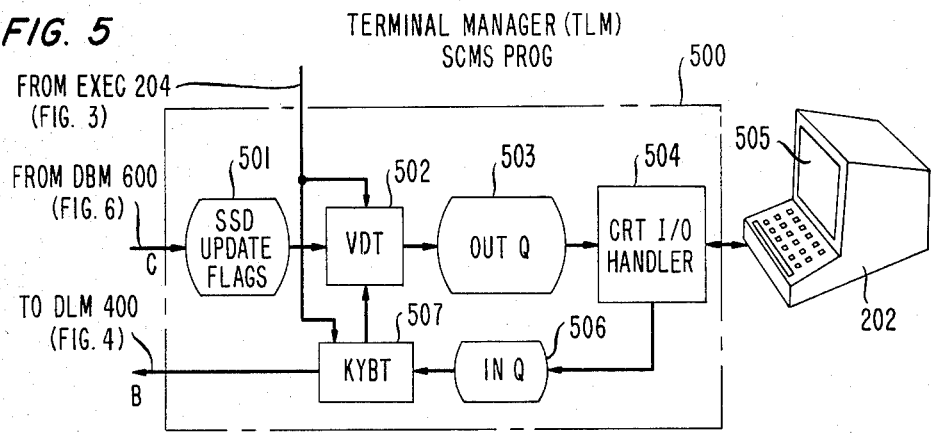
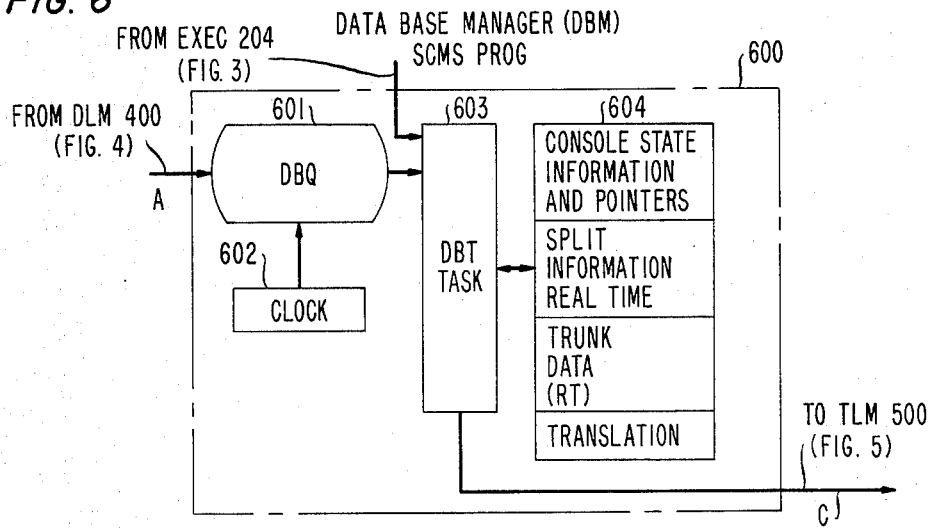

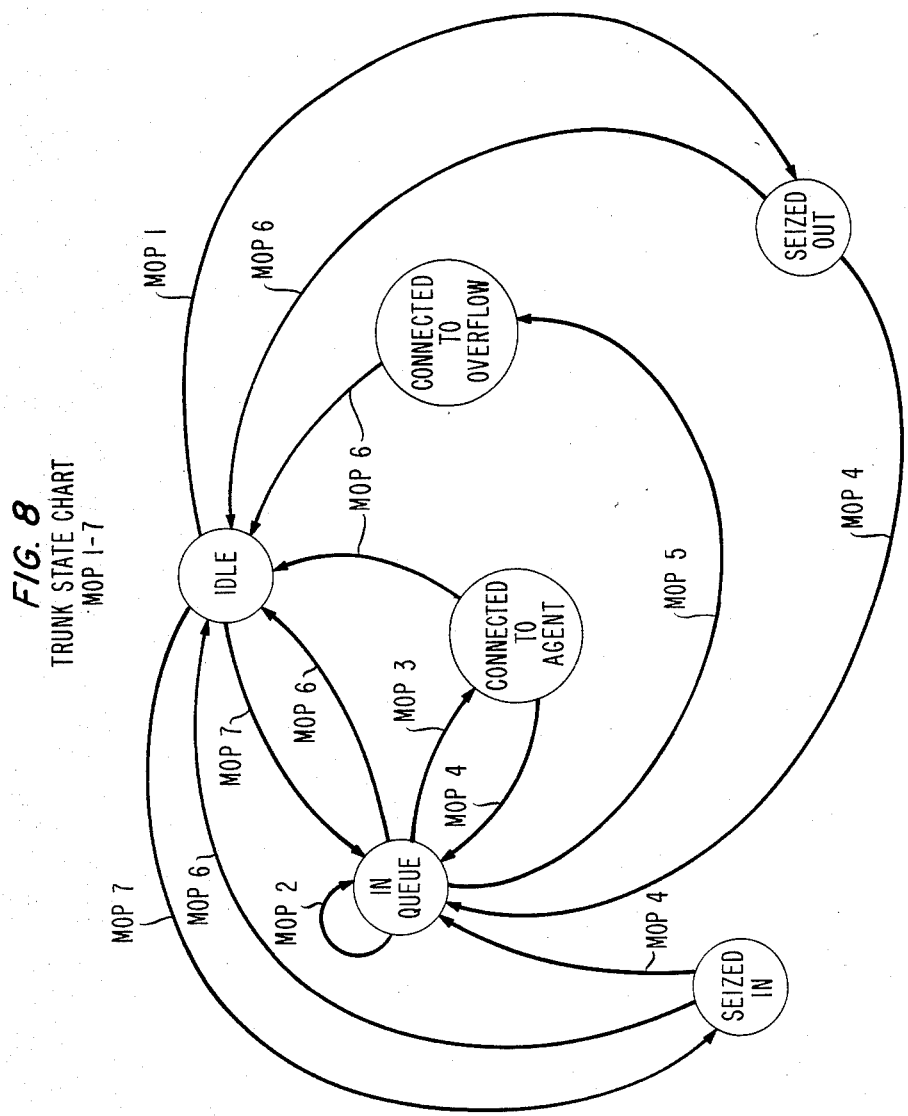

FIG. 9

| | | MOP 6<br>0<br>IDLE | MOP 7<br>1<br>IN QUEUE | MOP 3<br>2<br>CONNECTED AGENT | MOP 5<br>3<br>CONNECTED TRUNK | MOP 7<br>4<br>SEIZED IN | MOP 1<br>5<br>SEIZED OUT |
|---|---|---|---|---|---|---|---|
| 0 | IDLE | 0-0 | 0-1<br>NCW, OCW, TB | 0-2<br>X | 0-3<br>TB | 0-4<br>NB | 0-5<br>TB |
| 1 | IN QUEUE | 1-0<br>ABD, OCW, NCW, TB | 1-1<br>X | 1-2<br>OCW, NCW | 1-3<br>OCW, NCW | 1-4<br>X | 1-5<br>X |
| 2 | CONNECTED-AGENT | 2-0<br>CI, >YY, ATT, ASA | 2-1<br>X | 2-2<br>X | 2-3<br>X | 2-4<br>X | 2-5<br>X |
| 3 | CONNECTED-OVERFLOW | 3-0<br>NONE | 3-1 | 3-2<br>X | 3-3<br>X | 3-4 | 3-5 |
| 4 | SEIZED IN | 4-0<br>TB, TG | 4-1<br>X | 4-2<br>X | 4-3<br>X | 4-4<br>X | 4-5<br>X |
| 5 | SEIZED OUT | 5-0<br>TB, TG | 5-1<br>X | 5-2<br>X | 5-3<br>X | 5-4<br>X | 5-5<br>X |

← FROM →
← TO →

FIG. 10

TRUNK AND CONSOLE-RELATED DATA

| TRUNK SEIZED OUT | 3 | MOP 1 | TRUNK ID | |
|---|---|---|---|---|
| TRUNK REQUEUED | 4 | MOP 2 | TRUNK ID | STATION ID |
| TRUNK CONNECTED TO AGENT | 4 | MOP 3 | TRUNK ID | STATION ID |
| TRUNK TRANSFERRED TO SPLIT | 4 | MOP 4 | TRUNK ID | SPLIT |
| OVERFLOW OUT FROM TRUNK | 3 | MOP 5 | TRUNK ID | |
| TRUNK RELEASED | 3 | MOP 6 | TRUNK ID | |
| TRUNK SEIZED IN | 3 | MOP 7 | TRUNK ID | |

FIG. 11

AGENT-RELATED DATA

| AGENT-CONSOLE STATUS | 7 | MOP 8 | STATION ID | BUTTON STATUS | BUTTON STATUS | BUTTON STATUS | BUTTON STATUS |
|---|---|---|---|---|---|---|---|
| AGENT LOGIN | 4 | MOP 9 | PDC | STATION ID | | | |

FIG. 12

```
12:09    1 JAN 82                SYSTEM STATUS DISPLAY              INITIALIZED  12:00
ID   IC S WS CS NC           ID   IC S WS CS NC           ID   IC S WS CS NC
bis  11 1                    sds  24 1                    
     13 1 CW1 1              crm  25 2 ACW 1
     14 1                    nrs  26 2 ACW B 3
ofg  15 1   IN 1  2          gts  27 2 ACW B 2
     16 1                         28 2 IN  1
msl  17 1   IN B             paw  29 3 IN  B 2
aaj  18 1   IN B             whs  30 3 IN  B 4
     19 1                         31 3
tq   20 1   IN B             mdl  32 3 ACW 1
     21 1                    as   33 3 CW2 1
     22 1
     23 1

S NPS IN ACW OCW NCW  CI  >YY ABD ATT ASA IF1 IFO   GP TB/NT GP TB/NT GP TB/NT
1  5   4   0   0   0   6   0   0   2  90   8   0   0   A1  3/6
2  4   1   3   0   0   2   0   0   0 120   8   0   0   D2  0/4
3  4   2   1   0   0   3   0   0   0 300  15   0   0   C3  2/5
```

FIG. 13

```
12:11   1 JAN 82              SYSTEM STATUS DISPLAY              INITIALIZED  12:00
ID   IC S WS  CS NC      ID   IC S WS  CS NC      ID   IC S WS  CS NC      ID   IC S WS  CS NC
bis  11 1                sds  24 1
     12 1 CW1  1         crm  25 2 ACW  1
     13 1                nrs  26 2 ACW  B
ofg  14 1 IN   B 2       gts  27 2 ACW  B
     15 1                paw  28 2 IN   1
     16 1                whs  29 3 IN   B
msl  17 1 IN   B 1            30 3 IN   B
aaj  18 1 ACW  1              31 3
     19 1                mdl  32 3 ACW  1
tq   20 1 IN   B         as   33 3 CW2  1
     21 1
     22 1
     23 1

S NPS IN ACW OCW NCW   CI >YY ABD ATT  ASA IFI IFO   GP TB/NT GP TB/NT GP TB/NT GP TB/NT
1  5  3  1   30  2     7   0   2  110  15   0   0   A1  5/6
2  4  1  3   0   0     2   0   0  120   8   0   0   D2  0/4
3  4  2  2   0   0     7   6   0  300  15   0   0   C3  2/5
```

FIG. 14

```
12:13    1 JAN 82            SYSTEM STATUS DISPLAY              INITIALIZED  12:00
ID   IC S WS CS NC    ID   IC S WS CS NC    ID   IC S WS CS NC   ID  IC S WS CS NC
bis  11 1                   24 1
     12   CWI 1        sds  25 2 ACW 1
     13 1                   26 2 ACW B  3
     14 1  IN B  2     crm  27 2 ACW B  2
ofg  15 1                   28 2 IN  1
     16 1              nrs  29 3 IN  B  2
msl  17 1  IN B        gts  30 3 IN  B
aaj  18 1  IN B  1          31 3 IN  B  4
     19 1              paw
tq   20 1  IN B        whs
     21 1                   32 3 ACW 1
     22 1              mdl  33 3 ACW 1
     23 1              as S NPS  IN ACW OCW NCW   CI  >YY ABD ATT  ASA IF1 IF0  GP TB/NT  GP TB/NT  GP TB/NT
1  5   4   0  [120]  2   8   2   2  130   30  0   0   A1  6/6
2  4   1   3    0    0   2   0   0  120    8  0   0   D2  0/4
3  4   2   2    0    0   7   6   0  300   15  0   0   C3  2/5

EXCEPTION: SPLIT 1 OCW EXCEEDS 120 SEC
```

FIG. 15

12:15   1 JAN 82                    SYSTEM STATUS DISPLAY                    INITIALIZED  12:00
ID    IC  S  WS  CS  NC     ID   IC   S  WS   CS  NC     ID  IC  S  WS  CS  NC     ID  IC  S  WS  CS  NC
bis   11  1                 sds  24   1
      13  1   IN  B         crm  25   2  ACW  I
      14  1                 nrs  26   2  ACW  B   3
ofg   15  1   IN  B   2     gts  27   2  ACW  B   2
      16  1                 paw  28   2  IN   I
msl   17  1   IN  B   2     whs  29   3  IN   B   2
aaj   18  1   IN  B   1          30   3  IN   B   4
      19  1                      31   3
tq    20  1   IN  B         mdl  32   3  ACW  I
      21  1                 as   33   3  ACW  I
      22  1
      23  1

S  NPS  IN  ACW  OCW  NCW    CI  >YY  ABD  ATT  ASA  IFI  IFO    GP  TB/NT    GP  TB/NT    GP  TB/NT
1   5    5   0    90   1      9   3    2   130   45    0    0    A1   6/6
2   4    1   3     0   0      0   0    0   120    8    0    0    D2   0/4
3   4    2   2     0   0      3   6    0   300   15    0    0    C3   2/5

EXCEPTION: TRUNK GROUP A-ALL TRUNKS BUSY GREATER THAN 100 SEC

FIG. 16

SYSTEM STATUS DISPLAY    INITIALIZED 12:00

12:16    1 JAN 82

| ID | IC | S | WS | CS | NC | ID | IC | S | WS | CS | NC | ID | IC | S | WS | CS | NC | ID | IC | S | WS | CS | NC |
|---|---|---|---|---|---|---|---|---|---|---|---|---|---|---|---|---|---|---|---|---|---|---|---|
| bis | 11 | — | IN | B | | sds | 24 | — | | | | | | | | | | | | | | | |
| | 13 | — | | | | crm | 25 | — | 2 | IN | B | | | | | | | | | | | | |
| | 14 | — | | | 2 | nrs | 26 | 2 | ACW | B | 3 | | | | | | | | | | | | |
| ofg | 15 | — | IN | | | gts | 27 | 2 | ACW | B | 2 | | | | | | | | | | | | |
| | 16 | — | | | | paw | 28 | 2 | IN | I | | | | | | | | | | | | | |
| msl | 17 | — | IN | | 2 | whs | 29 | 3 | IN | B | 2 | | | | | | | | | | | | |
| aaj | 18 | — | IN | B | 1 | | 30 | 3 | IN | B | 4 | | | | | | | | | | | | |
| | 19 | — | | | | | 31 | 3 | | | | | | | | | | | | | | | |
| tq | 20 | 1 | IN | B | | mdl | 32 | 3 | ACW | I | | | | | | | | | | | | | |
| | 21 | — | | | | as | 33 | 3 | ACW | I | | | | | | | | | | | | | |
| | 22 | — | | | | | | | | | | | | | | | | | | | | | | |
| | 23 | — | | | | | | | | | | | | | | | | | | | | | | |

| S | NPS | IN | ACW | OCW | NCW | CI | >YY | ABD | ATT | ASA | IFI | IFO | GP | TB/NT | GP | TB/NT | GP | TB/NT | GP | TB/NT |
|---|---|---|---|---|---|---|---|---|---|---|---|---|---|---|---|---|---|---|---|---|
| 1 | 6 | 6 | 0 | 0 | 0 | 9 | 3 | 2 | 120 | 50 | 0 | 0 | A1 | 6/6 | | | | | | |
| 2 | 3 | 1 | 3 | 0 | 0 | 2 | 0 | 0 | 120 | 8 | 0 | 0 | D2 | 0/4 | | | | | | |
| 3 | 4 | 2 | 2 | 0 | 0 | 7 | 6 | 0 | 300 | 15 | 0 | 0 | C3 | 2/5 | | | | | | |

EXCEPTION: TRUNK GROUP A - ALL TRUNKS BUSY GREATER THAN 100 SEC

FIG. 17

| 12:17 | | | 1 JAN 82 | | | | | | SYSTEM STATUS DISPLAY | | | | | | | INITIALIZED 12:00 | | | |
|---|---|---|---|---|---|---|---|---|---|---|---|---|---|---|---|---|---|---|---|
| ID | IC | S | WS | CS | NC | | ID | IC | S | WS | CS | NC | | ID | IC | S | WS | CS | NC |
| bis | 11 | 1 | IN | B | | | sds | 24 | 1 | — | — | | | | | | | | |
| | 12 | 1 | | | | | crm | 25 | 2 | IN | B | | | | | | | | |
| | 13 | 1 | IN | B | | | nrs | 26 | 2 | ACW | B | 3 | | | | | | | |
| | 14 | 1 | | | 3 | | gts | 27 | 2 | ACW | B | 2 | | | | | | | |
| ofg | 15 | 1 | IN | B | | | paw | 28 | 2 | IN | — | | | | | | | | |
| | 16 | 1 | | | | | whs | 29 | 3 | IN | — | 1 | | | | | | | |
| msl | 17 | 1 | IN | B | 2 | | | 30 | 3 | IN | — | 2 | | | | | | | |
| adj | 18 | 1 | IN | B | 1 | | | 31 | 3 | | | | | | | | | | |
| | 19 | 1 | | | | | mdl | 32 | 3 | ACW | I | 4 | | | | | | | |
| tq | 20 | 1 | IN | B | 1 | | as | 33 | 3 | ACW | I | | | | | | | | |
| | 21 | 1 | | | | | | | | | | | | | | | | | |
| | 22 | 1 | | | | | | | | | | | | | | | | | |
| | 23 | 1 | | | | | | | | | | | | | | | | | |

| S | NPS | IN | ACW | OCW | NCW | CI | >YY | ABD | ATT | ASA | IF1 | IF0 | GP | TB/NT | GP | TB/NT | GP | TB/NT | GP | TB/NT |
|---|---|---|---|---|---|---|---|---|---|---|---|---|---|---|---|---|---|---|---|---|
| 1 | 6 | 6 | 0 | 0 | 0 | 11 | 5 | 2 | 110 | 50 | 0 | 0 | A1 | 6/6 | | | | | | |
| 2 | 3 | 1 | 3 | 0 | 0 | 2 | 0 | 0 | 120 | 8 | 0 | 0 | D2 | 0/4 | | | | | | |
| 3 | 4 | 2 | 2 | 0 | 0 | 7 | 6 | 0 | 300 | 15 | 0 | 0 | C3 | 2/5 | | | | | | |

FIG. 18

```
12:18    1 JAN 82              SYSTEM STATUS DISPLAY           INITIALIZED  12:00
ID   IC  S  WS  CS  NC         ID   IC  S  WS  CS  NC         ID  IC  S  WS  CS  NC
bis  11  1  --  --  --         sds  24  1  --  --  --
     13  1  IN  1   1          crm  25  2  ACW 1   
     14  1  --  --  --         nrs  26  2  ACW B   3
ofg  15  1  IN  B   3          gts  27  2  ACW B   2
     16  1  --  --  --         paw  28  2  IN  1   
msl  17  1  IN  B   2          whs  29  3  IN  1   2
aaj  18  1  IN  B   --              30  3  IN  B   4
     19  1  --  --  --              31  3  --  --  --
tq   20  1  IN  B   --         mdl  32  3  ACW 1
     21  1  --  --  --         as   33  3  ACW 1
     22  1  --  --  --
     23  1  --  --  --

S NPS  IN  ACW  OCW  NCW    CI  >YY  ABD  ATT  ASA   IFI  IFO    GP  TB/NT   GP  TB/NT   GP  TB/NT
1  6   6   --   0    0      12   5    2    100        0    0     A1  5/6
2  3   1   3    0    0       0   0    0    120        0    0     D2  0/4
3  4   2   2    0    0       6   6    0    300        0    0     C3  2/5
```

ACD MANAGEMENT INFORMATION SYSTEM

BACKGROUND OF THE INVENTION

This invention relates to a management information system (MIS) for use in conjunction with an automatic call distribution system (ACD).

Automatic call distributors (ACD) marketed in the past few years have included management information systems which are typically minicomputer-based adjuncts to the ACD. These MISs operate to collect various statistics about the call traffic through the ACD switch.

In management information systems, the emphasis placed on the type of information gathering is a function of the environment which the ACD faces and the objectives of the ACD managers. Typically, historical information is gathered to provide data useful in evaluating performance or service quality over some period of time. Various operations may be interested in these reports over half hour intervals, over an entire shift, for a whole day, a week or even a month. To allow for such information, display data bases are established to store the pertinent data from which the reports may be generated. Thus, time periods, or windows, are constructed and certain statistics are monitored during these periods for later presentation to a manager. Some of these statistics relate to hold times of each call and to the average speed of answer of the incoming calls.

ACD management problems are enhanced in small ACDs (with fewer than 50 stations) since the agent of the small ACD must typically handle a variety of non-ACD job responsibilities. These agents may be required to handle walk-in business or to make outgoing calls for the purpose of bill collecting or advertising in addition to handling incoming calls. During these activities the agent's console would not be available to receive ACD calls. Thus since the ACD traffic is not static, over time the manager must know at any instant exactly how the system is configured. This requirement, then, suggests an information arrangement which allows for rapid, "real time" rearrangement of ACD agents.

Even in the largest installations it is expensive to provide comprehensive information to satisfy all managers. The primary issue which faces the MIS designer, then, is how to allocate available resources to the various types of reports and how to present the information to the manager in a meaningful manner. Thus, it is necessary to known exactly what information is required for proper management control and to know when to update the information so as not to confuse the system manager with constantly changing meaningless information.

When using a video display screen to present the necessary data to the manager, it is important that the display not change every time a piece of information changes, while at the same time provision must be made to immediately update certain highly relevant information. These opposed criteria then impose severe restrictions on the design of any management information system and make the selection and presentation of information vitally important.

SUMMARY OF THE INVENTION

We have designed a real time responsive management information system (MIS) which effectively balances the competing data base gathering factors into a compact, easy to manage, system. We have accomplished this result by carefully imposing rules for defining real time control and for displaying, to a manager on a single display, the information necessary to show dynamic system operation thereby allowing for an immediate response by the manager. Using our system, the manager has the ability to observe and change:

(1) the number and split assignment of all trunks terminating on the ACD, (2) the number of agents assigned to each split and their job assignments, and (3) the parameters (such as overflow thresholds) which control traffic routing patterns through the switch.

These changes can be effected rapidly in order for the control to be in real time, and the system allows the manager immediately to observe the effects of any system changes.

Our system, in one embodiment, consists of a processor and data base, a video display terminal, and a set of data links to at least one ACD switching system. A single view provides the displayed information necessary for the system manager to understand the dynamics of the system and to make the appropriate changes.

In providing information for a data base the temptation is to give the viewer more data than the viewer needs or could possibly use and to display it in a manner which is confusing. This problem is compounded in situations where the information is constantly changing and where it is desired to provide the latest data.

This problem is overcome by separating the displayed information into segments, and providing within each segment, information pertaining to related parameters. The information is carefully selected to insure that the delay is not cluttered with numbers which only serve to add confusion to a dynamic situation. The segments have been arranged to be updated in sections such that for some bits of information the update occurs almost immediately, while for other bits of information the update is delayed for a short period of time. In this manner the display is updated, bit by bit, with the critical information being changed almost immediately upon occurrence. One advantage of this arrangement is that the screen does not go blank while the display is being reformatted. Thus the system manager can watch the display to see the changes as they actually occur, thereby obtaining a dynamic "feel" of the system.

This dynamic update is difficult to achieve since the actual position of certain bits of information on the display screen may change as various system configurations change. Thus, the display becomes more than simply reading a data base onto a video screen.

BRIEF DESCRIPTION OF THE DRAWINGS

The invention and its several other objects, features and advantages will be more fully understood from a reading of the following description to one embodiment taken in conjunction with the drawing in which:

FIGS. 4, 5, and 6 show details of the MIS;

FIGS. 7, 8, and 9 show state information pertaining to changed data;

FIGS. 10, 11 show examples of message formats between the ACD and the MIS; and

FIGS. 12 through 18 show examples of a typical display sequence.

GENERAL DESCRIPTION

Figure 1:
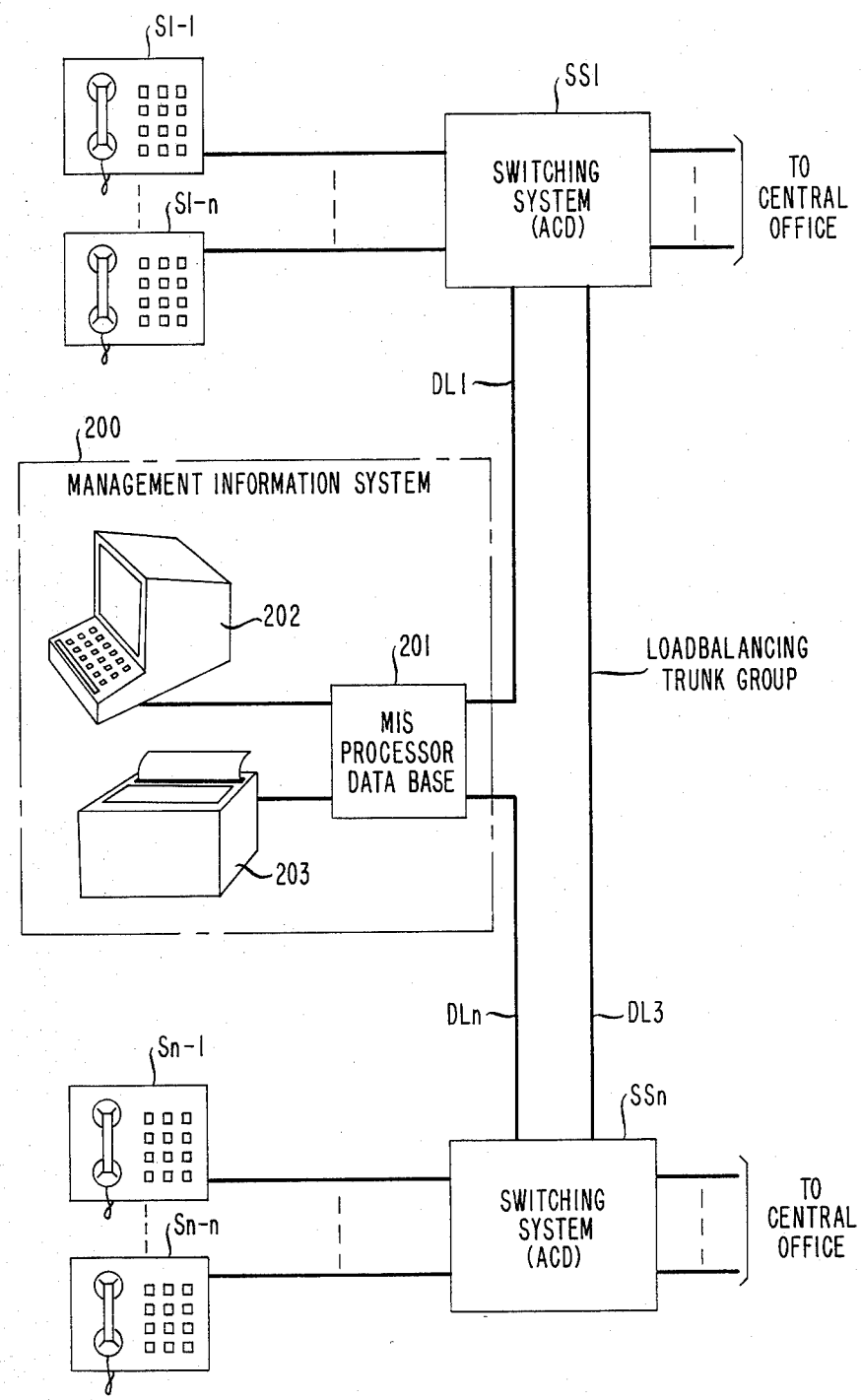
FIG. 1 shows an overall system schematic of management information system (MIS) having many ACD switching systems.

Management information system (MIS) 200 shown in FIG. 1 is used in conjunction with one or more ACD systems SS1-SSn, such as, for example, the ACD system shown in copending patent applications of E. T. Burke et al, filed May 28, 1982, Ser. No. 383,314, (now U.S. Pat. No. 4,449,017) and Ser. No. 383,315, (now U.S. Pat. No. 4,451,705) which applications are hereby incorporated by reference as if completely reproduced herein.

FIG. 1 shows groups of terminals or consoles S1-1, S1-n and Sn-1, Sn-n, each group associated with a particular ACD switching system and each console having multiple lamps and buttons. Management information system 200 comprises a processor and a data base 201 and also includes terminal 202 and printer 203. MIS 200 is connected to, and communicates with, the ACD systems by data links DL1 and DL2 which may be conventional phone lines or any other communication link, including switched network, bus contention, or microwave. Link DL3 is an interflow trunk used for load balancing between ACDs, if desired.

Figure 2:
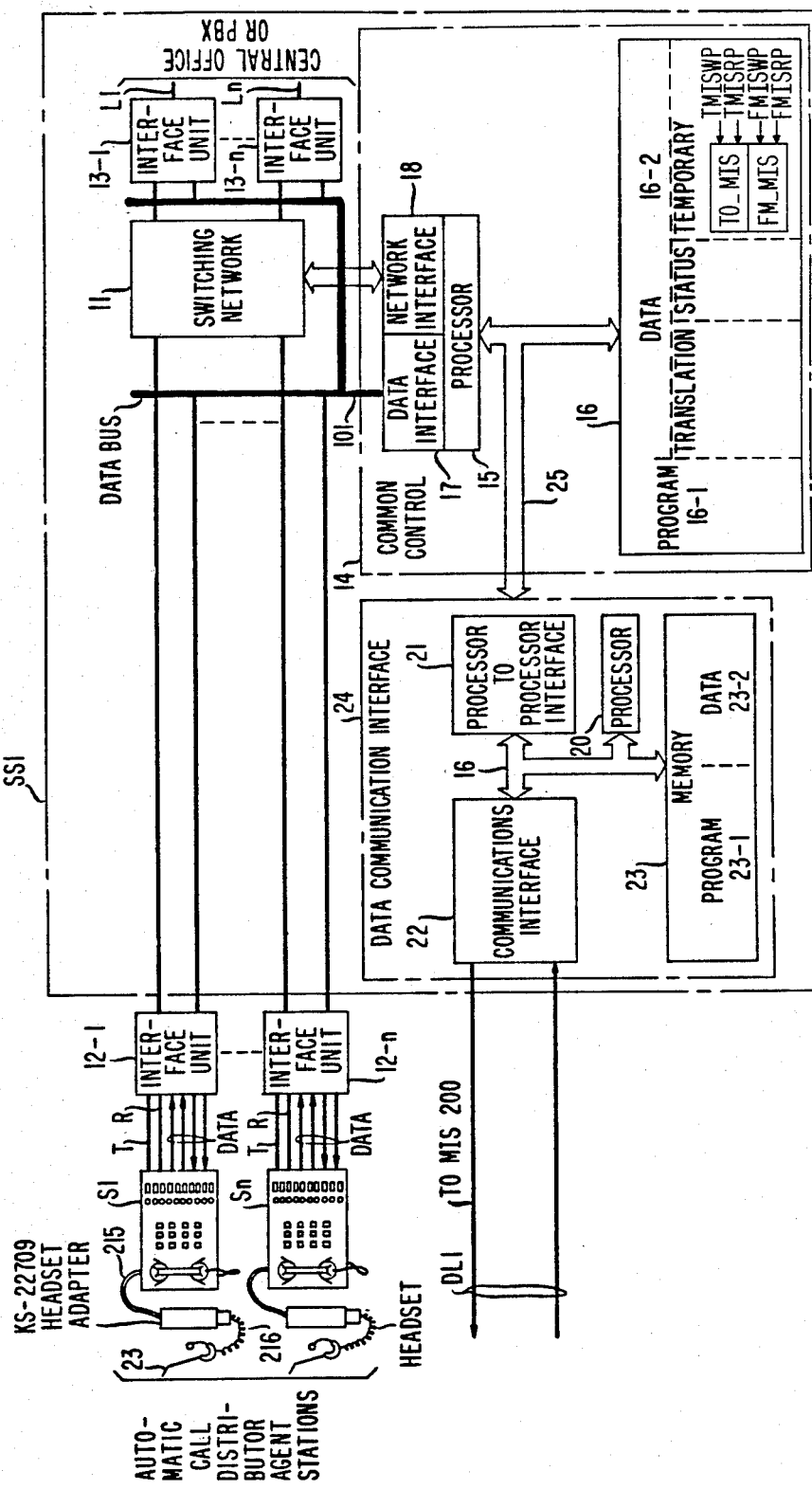
FIG. 2 shows details of one ACD switching system including the interface to the MIS.

As shown in FIG. 2, ACD system SS1 operates as detailed in the aforementioned E. T. Burke et al specification with the addition of data communication interface 24 which serves as the means by which the information necessary to operate MIS 200 is transmitted.

GENERAL PURPOSE INTERFACE

In FIG. 2, in memory 16-2, there are established two buffers called TO_MIS and FM_MIS. The TO_MIS buffer is used to send information to MIS 200 while FM_MIS buffer is used to accept information from MIS 200. Information flow to MIS 200 will be discussed first, since that is the dominant mode of information transfer.

Processor 15 deposits messages into the TO_MIS buffer and updates a writer's pointer. The name of the TO_MIS writer's pointer is TMISWP. There is also a data structure in memory 16-2 called TMISRP which is the buffer reader's pointer. Processor 20 in interface 24 through processor-to-processor interface 21 has access to common control 14 via this pointer. Whenever processor 20 checks its program store, it periodically checks the reader's pointer and writer's pointer in memory 16-2 via data link 25. A misalignment between those two pointers is an indication to processor 20 that there is a message in the TO_MIS buffer which must be transmitted to MIS 200. When this situation occurs, processor 20 then reads the TO_MIS buffer and copies the information into its own internal memory data store 23-2 and reformats the information in an RS232 format for transmitting over communications link DL1. This reformatted information is then transmitted via interface 22 and link DL1 to management information system 200.

Information in the reverse direction from management information system 200 enters interface 24 via interface 22 and is also deposited in data memory 23-2. Periodically, the program stored in memory 23-1 being executed by processor 20 causes the received data to be validated, the format changed, and, by means of processor-to-processor interface 21, transmitted into data memory 16-2 of common control 14 to the FM_MIS buffer. There are also two pointers associated with the FM_MIS buffer, namely the FMISWP (the FM_MIS writer's pointer) and FMISRP (the $FM_{13}$ MIS reader's pointer).

When a message is deposited in the FM_MIS buffer, processor 20 updates the FMISWP writer's pointer and now processor 15, as part of its procedure, periodically checks the FM_MIS reader's and writer's pointers. When these are out of alignment, the received message is processed.

As discussed priorly and as will be more fully discussed hereinafter, the content of the messages that are transmitted back and forth between the ACD and the MIS pertain to certain events, i.e., changes in state within the ACD, which are significant to the management information system. Thus, not every action which occurs in the ACD is communicated to the MIS. The ACD must be programmed to recognize and process certain messages pertaining to the significant information. In addition, the ACD must create a message set describing the changes in accordance with an agreed upon format with the MIS.

Before proceeding, let us look at the format of messages that are received by MIS 200 from the system ACD data link. Typical messages are shown in FIGS. 10 and 11. Even before a real time message is sent, the MIS requires a translation of stations to intercom numbers and trunk IDs to trunk groups. In addition, there are trunk-to-split translations and station-to-split translations. This information is either loaded directly into the MIS data base or sent via data messages (not shown) from the ACD. These translations are stored in the MIS data base and are used in processing the real time messages that are received as calls progress through the system ACD.

FIG. 10 shows the real time messages that relate to the trunk and console states. Messages that are received are of varying byte length with each byte having eight bits, the shortest being a three byte message, illustrated by message code 1 (MOP 1). For MOP 1 there is a three byte message with the first byte showing the total number of fields, the second byte showing the MOP code number, and the third byte being the index member of the trunk that was seized.

MOP 2 is a trunk requeued message having four bytes, the third byte being the trunk ID and the fourth byte being the station ID associated with the requeue request. The other trunk messages take basically the same format with a byte count number, a MOP code number, a trunk identification, and any other parameter that is appropriate to that message.

In FIG. 11 a more complicated message is shown as MOP 8, the agent console's status message. In this message we actually relate each button on the agent console by a bit mapped status chart. The agent console consists of eight buttons which are appropriate for reporting. Each button has associated with it a green (status) and red (I-Use) LED. For the SA1, SA2, ASSIST, and IN buttons, the green (status) LED indicates call status: IDLE, RING, BUSY, HOLD. The red (I-Use) LED illuminates when the agent's console enters the IN, ACW, or CWS (customer work state) states and remains lit as long as the console is in that state. The red (I-Use) LED associated with all other buttons illuminates when those buttons are activated and is extinguished when a call is either placed on HOLD or upon release. The state of these LEDs is updated whenever buttons are depressed or traffic is directed to or disassociated from the agent's console. Consequently, by knowing the LED state, the MIS can determine the agent's console status. Each button is reported using four bits showing the I-Use, busy, ringing and hold states. Since each byte of the MOP code message contains eight bits, it is possible to use four bytes to communicate the status of eight buttons. As will be seen, the I-Use lamp (red LED) status is used to display the work state of the agent, and the green LED status is used to derive the call state of the agent. These lamp states and the operation of a non-ACD system is fully detailed in U.S. Pat. No. 4,150,259, issued Apr. 17, 1979, hereby incorporated by reference.

Figure 3:
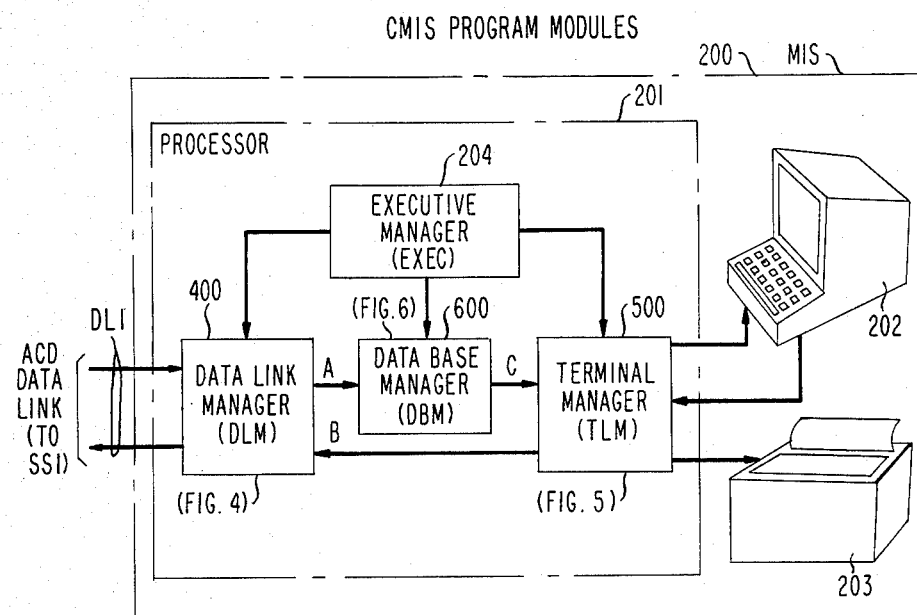
FIG. 3 shows a blocked diagram of the management information system with major software modules superimposed on the processor.

These messages, as well as other messages which are necessary, pass from the ACD switching system, for example SS1 as shown in FIG. 2, via general purpose interface 24 over bus DL1 to management information system 200, FIG. 3. These messages received via data link manager 400 are processed in the manner, to be more fully detailed hereafter, into data base 600. Once stored in the data base, this information is then made available via terminal manager 500 to video display 202 or to printer 203. All of these processes are controlled by programs contained in executive manager 204. At this point it is sufficient to say that the output from the terminal manager 500 can be directed to the VDT 202 or printer 203 by simply changing the device address. Further discussion will be directed only to the VDT.

Figure 4:
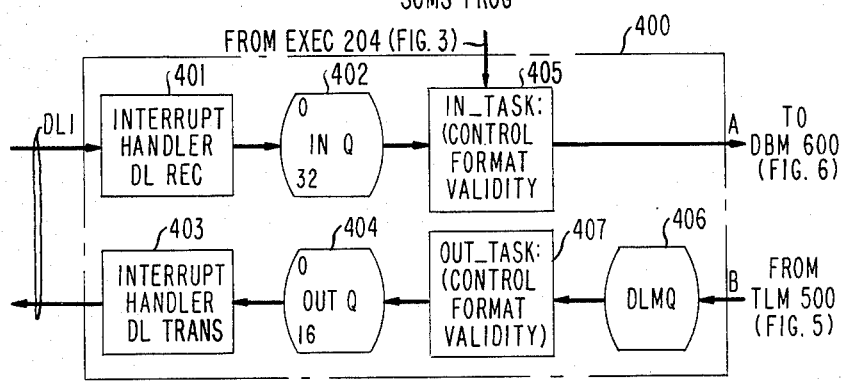

Turning now to FIG. 4, we will discuss the operation of data link manager 400 in conjunction with the receipt of a message over link DL1. The data link manager software actually runs at two processing levels, an interrupt level and a background level. The background level is controlled by the executive manager 204 (FIG. 3) and is given a portion of the real time available to the processor. The executive manager basically time shares the available time between three managers which control MIS 200.

Each byte of a message that is received at input DL1 generates an interrupt which activates interrupt handler 401. Each interrupt allows one byte of information to be passed from the data link input DL1 to input buffer INQ 403. Each message contains a framing bit included with the first byte of each message. The first byte, as discussed above, also includes the number of bytes that will be received in the total message. When all bytes have been received by interrupt handler 401, a message count is incremented in the input buffer to identify that a message is ready for background processing. At the same time the background task, IN_TASK 405, is set to the run state so that the message will be processed on the next task loop cycle. The message processing at this level consists of basic format and validity checking. After this is accomplished, the message data is passed over lead A to data base manager 600 (FIG. 6).

Continuing in FIG. 4, messages that must flow back to the ACD, such as a request to reassign a trunk to terminate on a different split would be loaded for the data link mananger in DLMQ 406 and processed by OUT_TASK 407. OUT_TASK 407 formats the message into buffer OUT QUEUE 404 which is then unloaded through interrupt handler 403 and transmitted over data link DL1 to the ACD one byte at a time.

Turning to FIG. 6, we will now describe the specification of data base manager 600. The basic format of data base manager 600 shows data base 604 consisting of four informal storage groups: a console, split and trunk data area which contains all data needed to format the respective console, split and trunk group portion of the status display (FIG. 12); and a translation data base which maps each data link message to an associated agent console, split and/or trunk group section of the data base. Each of these data areas can be indexed directly by terminal manager 500 (FIG. 5) using the index of the item to be displayed, i.e., index 15 in the console data area would retrieve console 15 data, index 3 in the split data area would retrieve split 3 data, etc. Data is placed in these areas by DBT TASK 603 using the translation data area to map the ACD data link messages, received via DBQ 601 into the associated console, split and/or trunk group data area. A time stamp is also stored with each state for use in calculating elapsed time between state changes. These time stamps are also periodically monitored by the DBT TASK to detect when any of these user defined exception thresholds have been exceeded. The types of information stored in these areas will be illustrated in more detail hereinafter with respect to specific examples of displays which will be shown in dynamic format. At this point it is sufficient to note that the data stored in the various segments of data base 604 pertain to the data which will be displayed on the screen in the respective areas of the screen. Thus the object at this point is to load the proper data, which is received from the ACD system, into the proper data base in a manner such that data changed from the last updating is readily obtainable.

As shown in FIG. 6 messages from data link manager 400 (FIG. 4) are placed in DBQ 601 and identified by message MOP code. Also available to the data base manager is a clock mark (assigned by the data link manager 400 and updated by a clock interrupt every ten milliseconds) to identify the proper time to be associated with the event being processed. Data base task 603 is a background process that is periodically entered to check to see whether a message from DBQ 601 is ready for processing. DBT TASK 603 also has available to it a translation data base which has been set up initially to identify translations from trunk-to-split, station-to-split and trunk-to-group. By use of these translations the message event can be related to the appropriate data base portion of data base 604.

Before proceeding further, a brief review of the state chart shown in FIG. 8 is in order. The state chart shows the manner in which the trunk data is analyzed and input into the trunk data base. The typical situation is a change from IDLE to the IN QUEUE state and then from the IN QUEUE state to the CONNECTED AGENT state. Each of these transitions is shown with the associated MOP code message number.

In FIG. 9 there is a chart which shows the information which changes as the states change. For example, when moving from the IDLE to the IN QUEUE state box 0-1, it can be seen that the number of calls waiting (NCW) could change, the oldest call waiting (OCW) could change, and the number of trunks busy (TB) could change. Thus DBT TASK 603, FIG. 6, processes these possible changes into data base 604. In a similar manner it can be seen that a change from the IN QUEUE state to CONNECTED AGENT state box 1-2 the oldest call waiting (OCW) and number of calls waiting (NCW) states will change. Following the example, a change of state from IN QUEUE to IDLE can occur when the caller abandons the call before completion. This situation is shown in box 1-0 where it will be seen that the number of abandoned calls (ABD), the oldest call waiting (OCW), the number of calls waiting (NCW) and a trunk busy (TB) data will be changed. In a similar fashion, at the completion of a call the state will move from a CONNECTED AGENT status back to IDLE. Block 2-0 shows the information that is generated, namely peg count (CI) is increased, the >YY count might be incremented, the average talk time (ATT) would be calculated and the average speed of answer (ASA) will be updated.

Turning back to FIG. 6, we have just discussed how information is arranged into the split section of the data base 604 and into the trunk section of data base 604. Now we will discuss how information is put into the console section of data base 604. As part of the console data base one of the messages which is stored is the agent login message (MOP 9) which is stored in the data base directly from information passed from the ACD.

Turning to FIG. 7 we see a state chart for each of the buttons of the ACD. It will be recalled that in the AGENT CONSOLE status messages shown in FIG. 11, MOP 8, contain the station ID and information from eight buttons. Each button status has four bits. One of these bits, (first) is the state of the I-Use LED which is active when the key is depressed. The I-Use bit is used to determine the work state (WS) of the console. Once this bit is removed, there are three bits remaining. These three bits, which are shown in FIG. 7, represent the busy (left bit), ring (center bit) and hold (right bit) call states. These combinations are shown in the various state forms and are mapped directly into data base 604 (FIG. 6) and used to determine the call state (CS) for the console section of the screen display.

Available to the customer is the ability to identify agents by initials which are to be stored in the translation table. The message from the ACD identifies a login number which translates into the initials which were stored in the translation data base 604 and displayed on the screen in the ID field of the console.

In review for the console area of the display (shown in the upper left of FIG. 12) the ID field is determined from the translation data base and indexed by the personal dial code (PDC) of the agent logged into the console. Personal dial codes are discussed in detail in the aforementioned copening E. T. Burke et al patent application Ser. No. 383,315. The IC field is determined by a translation from station ID to intercom number. The S field is determined by the translation from station ID to split. The WS field is determined from the agent console status message MOP 9 from the I-Use LED bit. The CS field is determined from the button state chart shown in FIG. 7. The NC field is incremented each time the IN button on the agent console goes from the busy back to the idle state, box 2-0 of FIG. 9.

Continuing in review for the split section lower left of FIG. 12, the first field shown, the S field is the split numbers. The NPS field is incremented each time a new login message appears for a station in that split. The IN field is a reflection of the number of attendants currently in the IN work state and is updated each time the agent console status message indicates a work state change has occurred in that split.

The next column ACW is the after call work state. Again like the IN column, this field changes each time an agent in that split changes work state.

The next column is the OCW or oldest call waiting and reflects the number of seconds that the oldest call has been waiting. When a trunk-seized-in message is received, that trunk is put into a linked list of trunks that are IN-QUEUE for each split, and a time stamp is stored to mark the event. The OCW time can thus be determined by subtracting the time that the trunk at the top of the list was seized from the current time and displaying the result in seconds on the screen.

The NCW field shows the number of calls waiting which is a count of the number of calls waiting to be answered in the split and is the number of trunks that are currently in the call waiting linked list.

CI is the number of completed calls that have been handled by that split. This field is incremented each time a trunk in that split returns to the IDLE state after being connected to an agent.

The >YY column shows how many calls were answered in a predefined number of seconds and is updated when the trunk returns to the idle state after being connected to an agent.

Field ABD is the number of calls abandoned and is incremented each time a trunk state changes from the IN-QUEUE back to IDLE state.

The average talk time, ATT, is stored in the data base as the total number of seconds that calls are connected to agents working in the same split. The screen shows the average talk time which is the number of seconds connected divided by the number of calls completed.

Also stored in the data base is the number of seconds required to answer calls in that split. This number is divided by the number of calls completed to obtain the average speed of answer.

The IFI and IFO field show the number of calls intraflowed in and out of a split. This data is obtained when a trunk in queue is connected to a split other than its designated split in the translation data area.

Continuing now in the trunk section of the display (corner right), the heading shows group GP with a letter and split designation. The example shows group A1 which is a set of trunks labeled group A terminating in split 1.

The trunks busy (TB) is incremented as a trunk goes from an idle state to one of the busy states. This number is reduced every time a trunk goes back to idle. The number of trunks (NT) in the group is determined by the user via menu inputs into the translation data area.

Referring now to FIG. 6, once all proper information is contained in data base 604, the updated information is provided via bus C to terminal manager 500, FIG. 5. Also provided to terminal manager 500 is an indicator (flag) signal.

Going back into FIG. 6, the data base task which is running in the background is updating data items in the data base for consoles, splits and trunks. Each time an item is changed that is to be reflected on the status display screen, a flag is set in the SSD update flag structure 501, shown in FIG. 5, which informs the terminal manager that an update is required on the status display screen.

As shown in FIG. 5, periodic task VDT 502 checks the SSD update flags to see if data base changes have occurred. These flags are grouped such that each flag identifies a particular area of the status display 505 that has changed in data base 604. In addition, each item of the status display (FIG. 12) is grouped such that a priority can be assigned based on its probability of change since the last entry to the BDT task 502. Those areas with the lowest frequency of change are assigned the highest priority for update. Consequently, those with the highest rate of change are assigned the lowest priority for update. As an example, the time of day in the upper left-hand corner (FIG. 12) only changes once a minute. This change, when it occurs, has a higher priority of update than the priority for updating number of calls waiting (NCW) in the split area (lower left) of the screen. This insures that the least likely events will be updated even at times of peak system activity.

The lowest priority item is the oldest call waiting OCW (FIG. 12) area since it is constantly changing as long as there is a call in queue. In order to prevent constant updates to this item, it is sufficient to say that this is updated by a five second timer program.

Returning to FIG. 5, update flags 501 are ordered such that there is a set of flags for each console or station, a set for each trunk group, and a set for each split. Each of these flags can identify individual items within that group and whether the exception highlight should be activated for that item. The VDT task 502 can then identify which item in the split needs to be updated. Once the VDT task knows which item is to be updated, a screen map that had been created by VDT task 502 when the report was put on the screen, is used to control the position of the update. Task 502 formats an output string containing cursor positioning commands and positional information which has changed for the associated portion of the screen. If the update flags also indicate that an exception exists in the updated area, the necessary screen highlighting commands are also added to the formatted output string. Exception messages are also displayed on the last link of the status display showing the reason for the highlighted item. This information is loaded into out queue 503. At interrupt level CRT handler 504 unloads the output queue one byte at a time and sends it to the display device 202. We will now describe how the terminal manager knows where the individual items are on the screen. This is done at the time the report is initially displayed. The report is displayed on demand by the customer, and at that time the console area of the data base is searched to find which consoles are equipped. This information is then sorted by the intercom number in the split that is designated for that console. This leaves a display which will then show all consoles terminating in split one at the top of the left-hand column followed by all consoles terminating in split two. The display map is then put into the translation area so that when updates are required, there is a direct translation from the intercom number to the current position on the screen. The data items that are to be displayed are read directly from the data base that is created by the data base manager, FIG. 6.

Terminal manager 500 also contains programs which process user commands inputted via the keyboard of VDT 202. The program structure is similar to that described previously for data link manager 400 (FIG. 4). Input commands consist of ASCII formatted strings received at interrupt level by CRT I/O handler 504 and loaded into INQ 506. When the last character of the command is received, background task KYBT 507 is set to the run state where the command is interpreted. Commands which request changes to the current display are passed directly to the VDT task 502 while commands which request changes to the HORIZON ACD configuration are passed to data link manager 400 (FIG. 4).

Of course it will be noted that all of the processes which have been described with respect to MIS 200 are controlled and run on a microprocessor, such as for example the Intel 8086 microprocessor. However, any microprocessor properly programmed in accordance with the description furnished herein could be utilized to control an MIS system based on information from any ACD. It should also be noted that the exact format of the information coming from the ACD system to the MIS system is not critical so long as both sections of the system can communicate the information necessary for proper display.

SYSTEM STATUS DISPLAY

Since MIS 200 is founded on the ability of the system supervisors to rearrange the system from information provided on terminal 202, that information, called the system status display (SSD) information, will now be discussed in detail.

The system status display was developed with the objective of providing the manager with a single CRT screen of information which would allow him/her to monitor the service performance of each split, blocking information on trunk groups and current data on agent activities. A typical display is shown in FIG. 12.

CONSOLE DATA

As discussed above, the status display contains information about the identity and current activities of the agents who are logged on the system—in particular, the:

(1) agent's initials (shown in FIG. 12 under the column labeled ID),
(2) the intercom number of the staffed console (IC),
(3) the console's split assignment (S),
(4) the current work state (WS),
(5) the current call state (CS), and
(6) the number of calls handled in the current work state (NC) since the last data base initialization.

The first three entries are useful when the system manager must reassign consoles between splits or reassign agents to work states. In these cases, the manager may wish to talk with the agent at a particular console or may need to know which consoles are the best candidates for transfer to a new split.

The current work state refers to the last depression of a work state button by the agent. The choices are the IN state (IN), the after-call work state (ACW) and up to three customer-defined work states (CWS). ACD calls which are never directed to an individual agent must be answered by an agent in the IN state (agent pool). In the other work states, the agent is removed from the agent pool available to receive ACD calls. The after-call work state is used for work related to an ACD call after the ACD call has been completed. This work may be some type of paper work or any other support activity.

The call state indicates the current telephone activity at the console. The entry for an agent is chosen, as discussed previously, independent of work state, from the busy, idle, hold, and I-Use conditions of the console lamps. This field is of use when the manager wishes to monitor current agent activities.

The number of calls handled entry refers to the number of completed incoming (outgoing) calls if the current work state is the ACD (ACW, CWS1, etc.). This number refers to the calls which have occurred since the last initialization of the short term data base (this can occur on an interval of 30 or 60 minutes at the manager's discretion). This same data base will be used as the basis of computations for split and trunk data. The NC entry can assist the supervisor in determining the relative ability of agents who have worked in the same split and in the same work state since the last initialization of the data base.

In addition to this information for agents who are logged in, the console portion of the report lists the intercom numbers and the split assignments for those consoles which are provided in the system, but which are not staffed currently.

SERVICE INFORMATION

The second or lower left part of the display deals with the service each split is providing to its ACD traffic. For each split(s) in the system, the report will display:
(1) number of positions staffed (NPS),
(2) number of agents in the ACD work state (IN),
(3) number of agents in the after call work state (ACW),
(4) oldest call waiting (OCW),
(5) number of calls waiting for ACD service (NCW),
(6) number of incoming calls handled (CI),
(7) number of calls served after waiting for a customer-specified length of time (>YY),
(8) number of abandoned calls (ABD),
(9) average talk time (ATT),
(10) average speed of answer (ASA),
(11) number of incoming intraflowed calls handled (IFI), and
(12) number of outgoing intraflowed calls (IFO).

There are three functions this collection of information serves. First, various measures of the service quality that each split maintains is presented. The NCW, OCW, ASA, ABD and >YY fields are all attempts to measure different facets of this variable. The interactions between the quantities will be discussed in detail hereinafter. Second, traffic flow through the ACD is estimated by the NIC, ATT, IFI and IFO fields. The first two fields measure net call demand on the agents in the split, while the last two fields indicate which splits cannot adequately handle the traffic that is offered to them and which splits compensate for that inability.

TRUNK GROUP STATUS

The third section (lower right) of the status report is a summary of the current traffic in the system based on trunk groups. For each trunk group in the system, the report includes:
(1) trunk group and split identification (GP),
(2) number of busy trunks (TB),
(3) number of trunks in the trunk group (NT), and
(4) split associated with the trunk group (included under the group letter heading).

This information allows the supervisor to tell at a glance the degree of congestion in the trunk groups which terminate on each split. In conjunction with the exception reporting system, these fields indicate when calls may not be able to enter the system because of trunk limitations.

EXCEPTION REPORT NOTIFICATION

The bottom line of the system status display (not shown) is reserved for a display of the most recent exception report. An exception report draws the attention of the system manager to an unusual condition that has occurred or is in progress.

The exception reporting system notifies the system manager of any unusual circumstances or undesirable situations which may arise in the course of ACD operations. Different operations require notification of different events and at different thresholds for each exception. For this reason, the MIS provides the system manager with the ability to choose among a large variety of exceptions for which notification will be provided and the ability to choose from a wide range of possible thresholds.

There are two parts of the exception reporting system: (1) the notification system and (2) the exception log. The exception log records the time and type of the last twenty exceptions which have occurred. It can be examined at any time by the supervisor and printed on demand or automatically.

The type of notification the system manager receives when an exception occurs depends upon the report displayed on the screen at that time. When the system status dislay is on the screen, the type of exception is printed on the bottom line of the display. To insure that the supervisor does not forget that these exceptional conditions exist, an option may be chosen which causes exceptions to highlight various fields in the display. Different exceptions will highlight different fields. When the exceptional condition is corrected, the highlight and its message (if it still appears on the screen) are removed. In addition, the manager may specifically request that all the highlighted fields be returned to normal.

The system manager may also choose to be notified by an audible indication that an exception has occurred. If the system status display is not on the screen when an exception occurs, the manager will be notified only if the optional and audible notification has been chosen. However, if the display is subsequently requested, all fields corresponding to unresolved exceptions will be highlighted and the most recent exception will be shown on the bottom line of the display.

DISCUSSION OF SYSTEM STATUS DISPLAY

The following discussion illustrates how the system status display of the MIS provides the system manager with real time information which allows for immediate operational control of the system. This control is intended to correct situations depicted by the system status display reflecting problems in three different areas, namely:
(1) Poor grade of service—this condition indicates that the customer's own criteria for service to clients are being exceeded. (These expected values will be determined through the customer's objectives or simply through normal experience.) Thus, calls either are not being answered quickly enough, or the agents are spending too much time with each call.
(2) All trunks busy—this indicates that all calls incoming to a particular split on a particular trunk group are being lost due to a busy condition on all trunks, i.e., calls attempting to reach the split may not even arrive because all the trunks are busy.
(3) Poor agent performance—this indicates that corrective action should be taken with particular agents due to their poor performance in certain call areas.

The following example depicts all these situations, how they are communicated to the system manager, and the natural steps which are taken to correct the situation. The example will start with a base case as depicted in FIG. 12. The measured times for values depicted on the different splits in the split report section of the systems status display are as shown. The average talk time (ATT) for each split is shown to be 90 seconds for split 1, 120 seconds for split 2, and 300 seconds for split 3. The measured after-call work (ACW) time (not shown) associated with split 1 is none, 60 seconds for split 2, and 60 seconds for split 3. The measured number of agents (NPS) required to handle the traffic for the splits is five for split 1 and four for splits 2 and 3. The reported average speed of answer (ASA) for splits 1 and 2 is 8 seconds; and for split 3, 15 seconds. The desired indication (not shown) for calls answered in greater than a specified time (>YY) is 60 seconds for splits 1, 2 and 3.

FIG. 12, as can be seen from the service display (bottom left) portion of the display, shows the system operating after nine minutes under these nominal values with five agents in split 1, four of which are doing ACD work; four agents in split 2, of which three are doing after-call ACD work, but no calls are coming into that split, so one is remaining in the available IN pool; four agents in split 3, of which two are busy on incoming calls, a third is busy doing after-call work, and a fourth has been assigned to work (CS2) other than ACD work.

The example we will follow starts with this base case, and looks at an illustrative example of what happens when the number of calls incoming to the system exceeds the present capacity of a split. In this example, all the activities on splits 2 and 3 are frozen, i.e., there will be no changes in the numbers associated with those two splits on subsequent time sequences. This is done so that the reader may more easily follow the activities of what is going on in split 1.

Referring again to FIG. 12, it can be seen that agent BIS is on position 13 and doing work (CW1) other than ACD work. Agent OFG on position 15 is in the IN pool and idle. Although OFG is idle, two calls (shown in column NC) have been handled by OFG since the status display was initialized at 12 o'clock. The time is now 12:09.

Agent MSL at position 17 is also in the IN pool, but is busy on a call. MSL has answered one call since the status display was initialized. Agent AAJ at position 18 is also working on an incoming ACD call and is busy. AAJ has completed no calls since 12 o'clock. Agent TQ is also in the IN pool busy on an incoming call and has also completed no calls since the display was initialized.

From the status section of the screen we see that in split 1 there are five positions staffed of which four are in the IN state. None are in the after-call work state. There are no calls waiting, so the oldest call waiting OCW is zero. Six calls have been completed (CI) since the display was initialized. Two have abandoned (ABD) during that time. None have been answered out of range (>YY). The average talk time (ATT) is the measured value of 90 seconds. The average speed of answer (ASA) is also the measured value of eight.

From the trunk status portion of the screen, we see that all trunks assigned to split 1 are also assigned to trunk group A. In this trunk groups which contains six trunks, three of them are busy. Thus, by comparison to the upper screen we known these trunks are in the talk state to agents MSL, AAJ, and TQ.

FIG. 13 shows the situation depicted in FIG. 12 two minutes later at 12:11. During that time, one call has been completed (CI now shows seven). Agent AAJ has completed the call and gone into the after work state, a situation which is not expected to happen in split 1.

Referring to the split report (lower left screen), there are now three agents in the IN pool, one doing after-call work. In the meantime, two more calls have come into the system, the oldest call (OCW) of which has been there for 30 seconds. The total incoming calls answered since the display was initialized has gone to seven, and none of them when answered out of bounds (>YY). No more calls have abandoned (ABD). Note, however, the average talk time (ATT) has now increased to 110 seconds indicating that at least one of the agents is slow completing a call. The average speed of answer (ASA) has also risen to 15 seconds. In the trunk group report it is seen that five of the six trunks incoming to split 1 are busy.

FIG. 14 shows the same situation two minutes later at time 12:13. During this time no calls have been completed, although agent AAJ has gone back into the IN pool and answered one more call. In addition, an additional call has come into the system. Therefore, there are still two calls waiting (NCW), the oldest of which (OCW) has gone to 120 seconds. This has created a situation in which all the trunks in the trunk group are busy, and an exception report has been issued by the system indicating that the oldest call waiting has exceeded the agent serving criteria of 120 seconds. This is called to the attention of the system manager by reverse video under OCW. Also a bell (or other audible device) sounds to alert the manager to the exception condition.

The exception reports are used to highlight when particular customer specified thresholds are exceeded. The exception report is issued on the bottom line and the particular value that has been exceeded has been highlighted as indicated in the figure by the square (which could be reverse video) around the 120 seconds in the OCW column. This is the first indication to the manager that the split is in trouble. Fortunately, there is a spare agent (BIS) assigned to split 1 doing something other than call answering work. With a request on the intercom from the manager agent BIS is asked to start answering ACD calls.

FIG. 15 shows the display another two minutes later. Agent BIS, who was in customer work state 1, is now busy in the IN pool. From the split report it is seen that five positions (NPS) are staffed in split 1. All five are in the IN pool, and all of them are busy answering ACD calls. The oldest call waiting (OCW) is now 90 seconds because of the addition to agent BIS. The number of calls waiting (NCW) has been reduced to one. The total incoming calls that have been handled (CI) has now grown to nine. This is due to the fact that agent MSL has completed a call and returned to the IN pool to answer another call. However, this call was answered in greater than the specified 60 seconds, and therefore, the number of calls answered in >60 seconds has grown to three.

The average talk time (ATT) is remaining constant at 130 seconds. The average speed of answer (ASA) has grown now to 45 seconds. Due to the fact that another call has come into the system on the idle trunk, all trunks are busy, and they have been busy for a time that exceeds the customer set criteria of 100 seconds. There is now a high probability (using the customer criteria of 100 seconds) of calls being lost because of a busy trunk and the manager should be something to ensure that the calls are answered more quickly. Now the number of trunks busy (TB/NT) is highlighted and an exception report generated.

FIG. 16 shows the situation one minute later after the manager has used the capabilities in the MIS to reconfigure the system. Agent SDS at position 25, formerly idle in after-call work on split 2, has been reassigned to split 1 and is now in the IN pool answering busy calls. From the split report, it is seen that the number of positions staffed (NPS) is now six in split 1 and three for split 2. The six agents in split 1 are all in the IN state. There are now no calls waiting (NCW). There have been no more calls completed (CI), so the number is still nine, three of which were answered in >YY (60) seconds. The number of abandoned calls is still two. The average talk time has been reduced to 120 seconds. This is due to the manager informing all agents that the split is overloaded and that they must complete their work more quickly. The average speed of answer (ASA) has continued to grow during this time and is now up to 50. The exception report remains indicating that all trunks are busy and have been busy more than 100 seconds.

FIG. 17 shows the situation one minute later when the manager's actions have had time to take effect. Particular attention should be given to agent TQ at position 20 who has been busy on a single call during the whole period of the example. Agent TQ has now terminated that call and is now busy on another call. In addition to that, agent OFG at position 15 has terminated a call and is busy on another incoming call. The number of positions staffed (NPS) is still six. All of them are still working in the IN pool. There are no calls waiting. The oldest call waiting is still zero. The incoming calls completed (CI) has grown to eleven, five of which were answered in >YY (60) seconds. Still only two have been abandoned, and the average talk time (ATT) has begun to creep down, now showing 110 seconds. The average speed of answer has remained the same at 50 seconds. All six trunks are still busy, but since two were idle during the past period, they have not all been busy >100 seconds. Therefore, the exception report has been deleted.

FIG. 18 shows the situation one minute later when the current crisis has subsided. Agent BIS at position 13 has now completed a call and remains in the IN pool, although idle. The number of positions staffed is still six. The number in the IN pool is still six. The number in after call work is still zero. There are no calls waiting. Twelve calls have been completed, of which five were still answered in >YY (60) seconds. The average talk time is now down to 100 seconds and only five of the six trunks in the trunk group are busy.

At this point, the system manager may make a decision to return one of the agents from split 1 back to split 2, or to continue to operate with six agents in this split until making certain that the number of incoming calls have actually subsided.

The foregoing description assumes an ACD which is separate from the display system. Of course, this need not be so, and the display may be integral with the ACD. Such an arrangement would result in a much simpler interface between the display and the system, and may avoid the need for strict adherence to protocols for the transfer of agent, station, and trunk data. Such a system would be built without departing from the spirit and scope of this invention. Also, it should be understood that the calls need not be incoming on trunks, but could be on lines.

What is claimed is:

1. A management information system (MIS) for use with an automatic call distribution (ACD) system having a plurality of attendant positions operable to answer incoming calls from a plurality of trunks, said MIS system comprising
   a display,
   means for continuously receiving from said ACD certain ACD data, said data corresponding to current call answering activity at said attendant positions,
   means for comparing said data to previously received data to determine which data is to be displayed,
   means for formatting any said data determined to be displayed, and
   means for presenting said formatted data to said display substantially concurrent with the reception of said ACD data.

2. The invention set forth in claim 1 wherein said formatting means is operative to create on said display three separate display sections, one section having data on an attendant position-by-position basis, one section having data on a statistical system basis, and the third section having data pertaining to said trunks.

3. The invention set forth in claim 1 further comprising means for storing system parameters against which the performance of said ACD is to be measured,
   means for matching certain segments of said current received data against stored ones of said parameters, and
   means for providing exception data to said display under certain mismatch conditions.

4. The invention set forth in claim 1 wherein said presenting means includes means for presenting to said display only data which has changed from the last time of presentation.

5. The invention set forth in claim 1 wherein said presented data is subdivided into individually updatable segments, said system further comprising
   means for storing for a period of time changed data to be presented to a particular segment while allowing other subsequently generated data pertaining to another segment to be presented to said display.

6. The invention set forth in claim 1 further comprising means for connecting said management information system to a plurality of automatic call distribution systems.

7. A communication system having a plurality of terminals operable for answering communication connections directed thereto, said communication system comprising
   means for receiving and storing in a data base information pertaining to certain measured variables of each answered communication connection, said storing occurring substantially concurrently with the occurrence of the measured variable,
   means for comparing subsequently received variables with priorly stored already displayed variables, and
   means for displaying selected changed variables.

8. The invention set forth in claim 7 wherein said communication connections are handled by attendants each having a unique identification code and each having more than one work state,
   said system including means for separating said displayed variables into segments, one segment containing attendant and terminal identification and work state information, and one segment containing system statistical information, and wherein said system also includes means for selectively updating certain information within each segment at intervals unique to said segment.

9. Theinvention set forth in claim 8 wherein said system includes means for assigning attendants with specific terminals and wherein said attendant information includes the unique identification code of each attendant in conjunction with the presently assigned terminal identification.

10. The invention set forth in claim 8 wherein said displaying means includes a data base containing pre-established exception parameters against which said stored variables are matched, and means for highlighting on said display those variables which exceed said pre-established exception parameters.

11. The invention set forth in claim 8 wherein said displaying means includes a data base containing pre-established exception parameters against which said stored variables are matched, and means for generating and displaying a message indicating that a certion pre-established parameter has been exceeded.

12. A system for dynamically displaying information pertaining to the operation of a telephone answering system, said telephone answering system having a plurality of stations from which calls incoming over trunks may be answered, said displaying system comprising means for receiving data pertaining to each incoming call to said telephone system, said data including trunk identification data, station identification data of the station answering an incoming call on a trunk, and the current status of each said station at said telephone system, means for determining when received data differs from priorly received data, and means for continuously presenting said determined different data to a visual display.

13. The invention set forth in claim 12 wherein said displaying system includes, means for associating unique digits with each attendant and wherein said presenting means includes means for formatting said visual display into separate sections, one section containing said unique attendant station associations, one section containing call completion information and one section containing trunk usage information.

14. The invention set forth in claim 13 wherein said displaying system includes means for establishing exception data values, and means for highlighting on said display that data which exceeds said established exception data values.

15. The invention set forth in claim 14 wherein said highlighting means includes means for generating and displaying a message indicating that a certain data value has been exceeded.

* * * * *